(12) United States Patent  (10) Patent No.: US 7,921,949 B2
Cantemir et al.  (45) Date of Patent: Apr. 12, 2011

(54) ALL WHEEL DRIVE ELECTRICALLY-VARIABLE TRANSMISSION

(75) Inventors: Codrin-Gruie Cantemir, Columbus, OH (US); Giorgio Rizzoni, Columbus, OH (US); Christopher J. Hubert, Neenah, WI (US); Gabriel G. Ursescu, Iasi (RO); Osvaldo Barbarisi, Avellino (IT)

(73) Assignee: The Ohio State University, Columbus, OH (US)

( * ) Notice: Subject to any disclaimer, the term of this patent is extended or adjusted under 35 U.S.C. 154(b) by 444 days.

(21) Appl. No.: 11/974,363

(22) Filed: Oct. 12, 2007

(65) Prior Publication Data

US 2009/0183933 A1  Jul. 23, 2009

Related U.S. Application Data

(63) Continuation of application No. PCT/US2006/013754, filed on Apr. 12, 2006.

(60) Provisional application No. 60/670,395, filed on Apr. 12, 2005.

(51) Int. Cl.
*B60K 17/04* (2006.01)

(52) U.S. Cl. .......... 180/65.6; 180/65.265; 903/909; 903/915

(58) Field of Classification Search .......... 180/65.21, 180/65.265, 65.6, 65.7; 903/909, 910, 915, 903/916, 952
See application file for complete search history.

(56) References Cited

U.S. PATENT DOCUMENTS

| 3,799,284 | A | * | 3/1974 | Hender | 180/65.25 |
| 5,897,453 | A | * | 4/1999 | Mimura | 475/246 |
| 6,146,304 | A | * | 11/2000 | Bendtsen | 475/230 |
| 6,165,094 | A | | 12/2000 | Williames | |
| 6,361,467 | B1 | * | 3/2002 | Chen | 475/247 |
| 6,729,991 | B1 | * | 5/2004 | Nishiji et al. | 475/221 |
| 7,520,354 | B2 | * | 4/2009 | Morrow et al. | 180/65.31 |
| 2003/0205422 | A1 | | 11/2003 | Morrow et al. | |

FOREIGN PATENT DOCUMENTS

| DE | 32 21 606 A1 | 12/1983 |
| JP | 07-015805 | 1/1995 |
| JP | 09-095149 | 4/1997 |
| JP | 2005-126021 | 5/2005 |
| JP | 2005-231526 | 9/2005 |

OTHER PUBLICATIONS

PCT—International Search Report.
Machine translation of JP 09-095149.
Machine translation of JP 2005-126021.
Machine translation of JP-2005-231526.
Machine translation of JP 07-015805.

* cited by examiner

*Primary Examiner* — Frank B Vanaman
*Assistant Examiner* — John D Walters
(74) *Attorney, Agent, or Firm* — Fay Sharpe LLP

(57) ABSTRACT

A transaxle (200) operatively connects a first associated rotational connection and a second associated rotational connection with an associated vehicle axle. An electrically-variable transmission includes an engine (108), a first electric machine (110) operatively connected to the engine, second and third electric machines (130 and 132), a first transaxle (126) operatively connecting the engine and second electric machine to an associated vehicle axle (104A), and a second transaxle (128) operatively connecting the first and third electric machines to another associated vehicle axle (104B). A method (300, 400, 500) is also included.

20 Claims, 13 Drawing Sheets ns on the carrier structure and operatively connected to the opposing associated axle portions. A first gear is disposed within the housing cavity and is operatively connected to the first associated rotational motion source. A second gear is disposed within the housing cavity and is operatively connected to the first gear. A third gear is disposed within the housing cavity and is operatively connected to the second

ALL WHEEL DRIVE ELECTRICALLY-VARIABLE TRANSMISSION

This application is a Continuation of International Application No. PCT/US2006/013754, filed on Apr. 12, 2006, which claims priority from U.S. Provisional Patent Application No. 60/670,395 filed on Apr. 12, 2005, which is hereby incorporated herein by reference in its entirety.

BACKGROUND

The subject matter of the present disclosure broadly relates to the art of vehicle powertrains and, more particularly, to an electrically-variable transmission and powertrain for an all wheel drive vehicle. It finds particular application and use in conjunction with high-performance passenger vehicles, and will be described herein with particular reference thereto. However, it is to be appreciated that the subject matter of the present disclosure is also amenable to use in other applications and environments, such as in trucks and sport-utility vehicles, for example, and that any specific reference to use in association with high-performance passenger vehicles is merely exemplary.

It will be appreciated that the present disclosure includes numerous rotating components (e.g., rotors, crankshafts, axles, gears) that can rotate at different speeds, rotate in different directions, transmit or carry different torsional loads, and/or transmit or carry different horsepower loads, as either inputs or outputs. For ease of reading and understanding, terms such as rotational connection, rotational output, rotational power source, and the like, have been used to broadly refer to any such rotational, torsional or power condition.

Vehicle powertrains that combine an internal combustion engine and one or more electric machines are generally known, and are commonly referred to as "hybrid" vehicles or vehicle powertrains. In recent years, substantial attention has been directed toward the development of hybrid vehicles and powertrains, and it is generally believed that substantial improvements have been achieved as a result of these efforts. For example, the operation of such hybrid vehicles are generally thought to have a lesser environmental impact than the operation of conventionally powered vehicles. This can be in the form of reduced carbon dioxide and other emissions, and/or improved fuel economy.

Typically, however, known hybrid vehicles are generally not thought of as being particularly well oriented toward vehicle performance and/or handing. Rather, most known hybrid vehicles have prioritized efficiency and fuel economy over performance, often using minimally sized internal combustion engines and electric machines to reduce weight and fuel consumption. To establish an acceptable level of performance, it seems that most hybrid vehicles target and attempt to attain performance levels that are not too much lower than those of comparable vehicles with conventional powertrains. Though, current hybrid vehicles generally do not perform or, often, handle as well as comparable vehicles powered by an internal combustion engine alone.

As a result, most known hybrid powertrains are not well suited for use in performance-oriented vehicles. As one example, hybrid powertrains have been developed and are commonly used on two-wheel drive vehicles. Though any one of a variety of configurations and/or arrangements can be used, most of such hybrid powertrains include an internal combustion engine that is used in combination with an electric machine to drive a single axle of a vehicle.

It is well known that substantial performance and handling benefits can be realized from the use of an all-wheel drive powertrain. For example, the effectiveness of a high-output power source (e.g., an internal combustion engine or an engine-electric machine combination) can greatly benefit from a corresponding transmission arrangement that can deliver output to all of the wheels of the vehicle. Due presumably to the focus on efficient and economical operation, however, most known hybrid powertrains have been developed to power only two wheels that are supported along a single axle of a vehicle. What's more, these known hybrid powertrains are not likely to be easily modified to drive more than two wheels, if these known hybrid powertrains are capable at all of being modified in such a manner.

One known hybrid powertrain is capable of at least part-time four-wheel drive. However, this known arrangement utilizes a typical two-wheel drive powertrain, such as that mentioned above, for example, to drive two of the wheels of the vehicle. Additionally, another, separate electric machine is provided adjacent the second axle and is operatively connected thereto to independently drive the second axle.

One disadvantage of such an arrangement, however, is that the second axle does not share the rotational and/or torsional output from the primary power source (e.g., the internal combustion engine and electric machine driveline). That is, the mechanical output from the internal combustion engine and electric machine combination of the primary driveline is not mechanically transmitted to the second axle. Rather, all of the rotational input applied to the second axle is provided by the additional electric machine, which is electrically powered by the first electric machine in operation as a generator and/or by batteries. Such an arrangement, however, includes numerous disadvantages that limit the utility and/or effectiveness of the same. For example, such an arrangement can limit the powertrains ability to allocate torque between the axles and can also limit the powertrains ability to couple torque allocation to the state of charge of the battery. Additionally, a relatively small sized additional electric machine may be easier to fit with the available mounting envelope along the second axle. However, such size of electric machine may also provide limited performance. Whereas, an additional electric machine of greater size will provide better performance, but will involve space constraints.

In an effort to overcome the above-described disadvantages and others, it is believed desirable to develop an all-wheel drive electrically-variable transmission or powertrain.

BRIEF DESCRIPTION

A vehicle transaxle in accordance with the present novel concept for operatively connecting opposing associated axle portions, a first associated rotational motion source and a second associated rotational motion source is provided that includes a transaxle housing including a housing wall at least partially defining a housing cavity. A gear carrier assembly is disposed within the housing cavity and includes a carrier structure, first and second pinions supported in spaced relation on the carrier structure and operatively connected to the opposing associated axle portions, and third and fourth pinions supported in spaced relation on the carrier structure. The first and second pinions are operatively connected to the opposing associated axle portions. A first gear is disposed within the housing cavity and is operatively connected to the first associated rotational motion source. A second gear is disposed within the housing cavity and is operatively connected to the first gear. A third gear is disposed within the housing cavity and is operatively connected to the second gear and at least one of the third and fourth pinions. A fourth gear is disposed within the housing cavity and is operatively connected to at least one of the third and fourth pinions. A fifth gear is disposed within the housing cavity and is operatively connected to the fourth gear and the second associated rotational motion source.

An electrically-variable transmission in accordance with the present novel concept for an associated vehicle that includes first and second associated axles is provided that includes an internal combustion engine including first and second rotational connections. A first electric machine includes first and second rotational connections. The first rotational connection of the first electric machine is operatively connected to the first rotational connection of the internal combustion engine. A second electric machine includes a rotational connection. A third electric machine also includes a rotational connection. A first transaxle operatively connects the second rotational connection of the internal combustion engine and the rotational connection of the second electric machine with the first associated axle. A second transaxle operatively connects the second rotational connection of the first electric machine and the rotational connection of the third electric machine with the second associated axle.

A wheeled vehicle in accordance with the present novel concept is provided that includes a vehicle structural assembly, and first and second axles operatively associated with the vehicle structural assembly. The first and second axles including opposing ends. First and second wheels are supported on different ones of the opposing ends of the first axle. Third and fourth wheels are supported on different ones of the opposing ends of the second axle. An engine is supported along the vehicle structural assembly and includes first and second rotational connections. A first electric machine is supported along the vehicle structural assembly and includes first and second rotational connections. The first rotational connection of the first electric machine is operatively connected to the first rotational connection of the engine. A second electric machine includes a rotational connection, and a third electric machine also includes a rotational connection. A first transaxle operatively connects the second rotational connection of the engine and the rotational connection of the second electric machine with the first axle to drive the first and second wheels. A second transaxle operatively connects the second rotational connection of the first electric machine and the rotational connection of the third electric machine with the second axle to drive the third and fourth wheels.

A method in accordance with the present novel concept of powering a vehicle that includes a first axle and a second axle is provided that includes providing an engine that includes first and second rotational outputs, a first electric machine that includes first and second rotational outputs, a second electric machine that includes a rotational output, a third electric machine that includes a rotational output, and a electrical storage device. The first rotational output of the first electric machine being operatively connected to the first rotational output of the engine. The first, second and third electric machines being in electrical communication with the electrical storage device. The method also includes providing a first transaxle operatively connecting the second rotational output of the engine and the rotational output of the second electric machine with the first axle, and providing a second transaxle operatively connecting the second rotational output of the first electric machine and the rotational output of the third electric machine with the second axle. The method also includes generating rotational output from the engine and at least one of the first electric machine, the second electric machine and the third electric machine. The method further includes transmitting the rotational output through the first and second transaxles to rotate the first and second axles.

DETAILED DESCRIPTION

Figure 1:
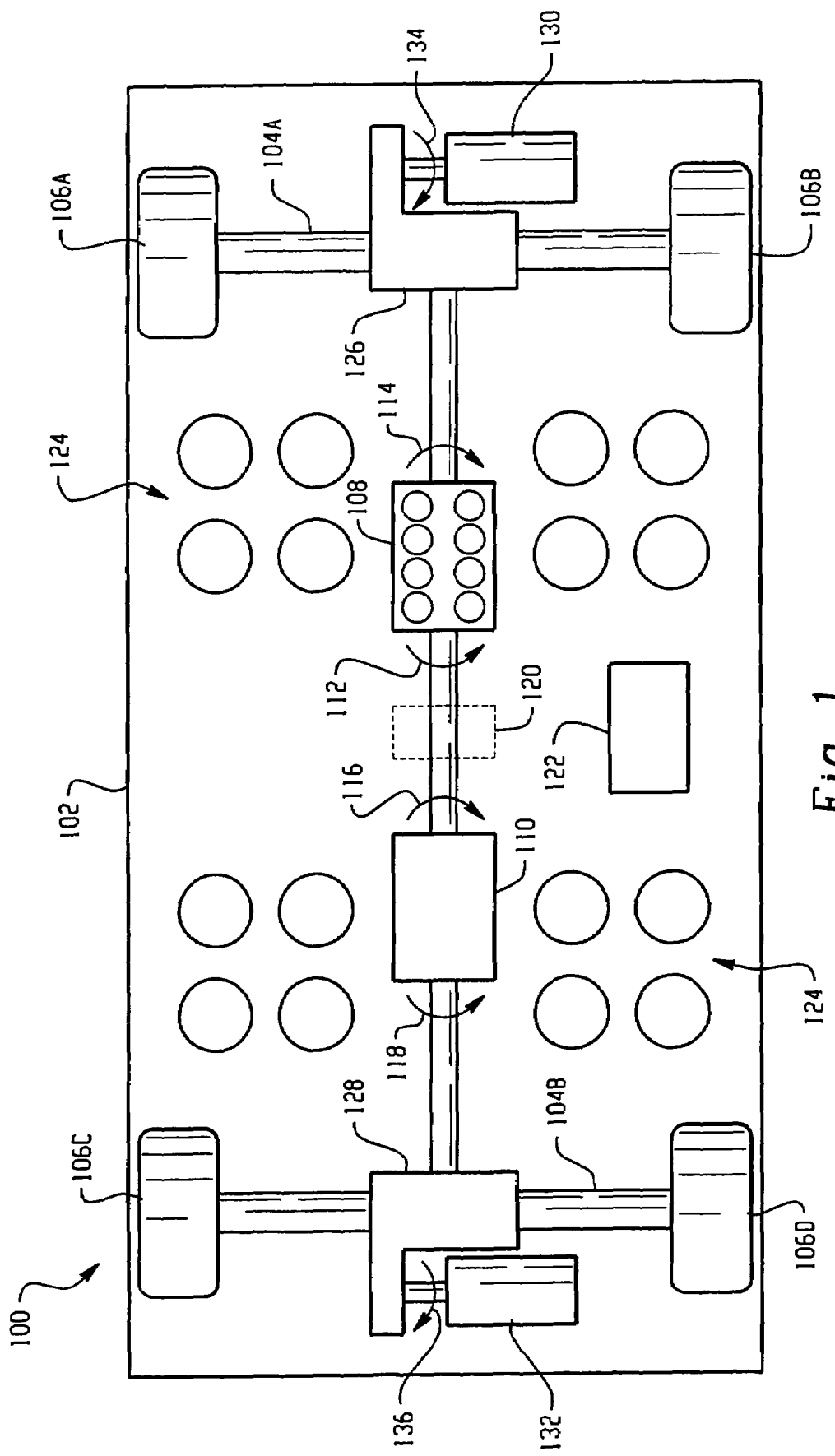
FIG. 1 is a schematic representation of one exemplary embodiment of an all-wheel drive electrically-variable transmission in accordance with the present novel concept shown on a vehicle.
Figure 2:
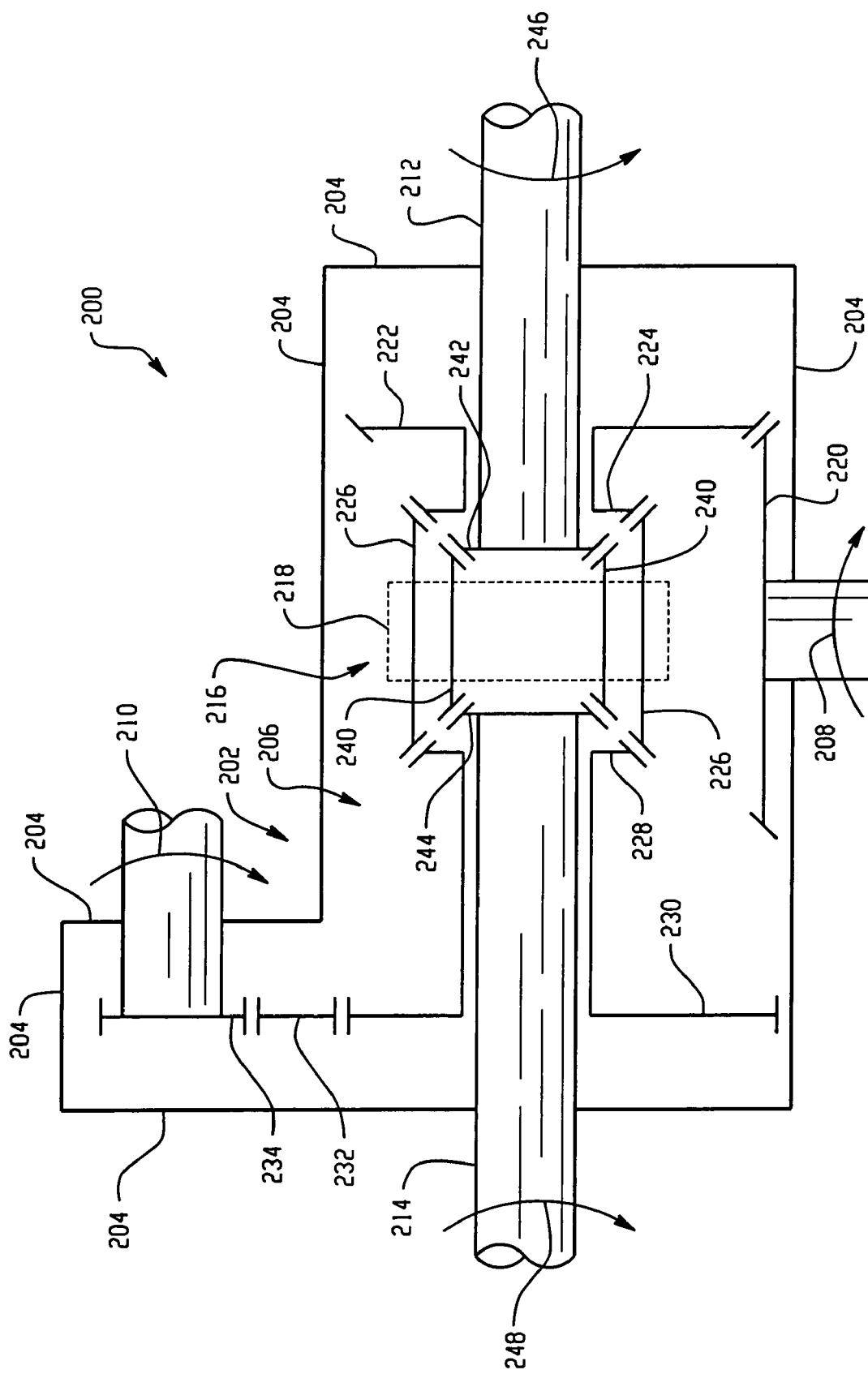
FIG. 2 is a schematic representation of one exemplary embodiment of a transaxle in accordance with the present novel concept.
Figure 3:
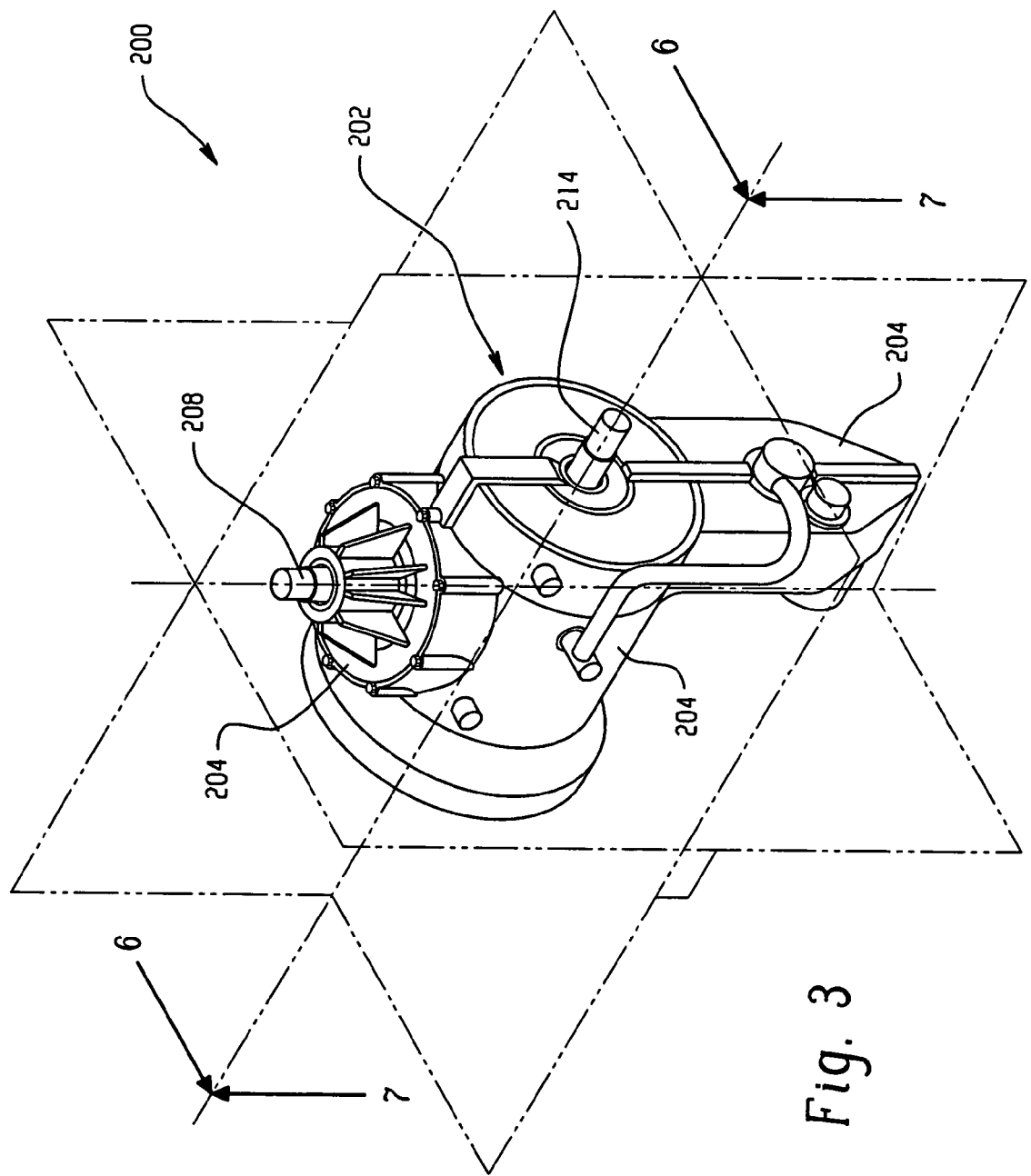
FIG. 3 is a perspective view of one exemplary embodiment of the transaxle in FIG. 2 shown in additional detail.
Figure 4:
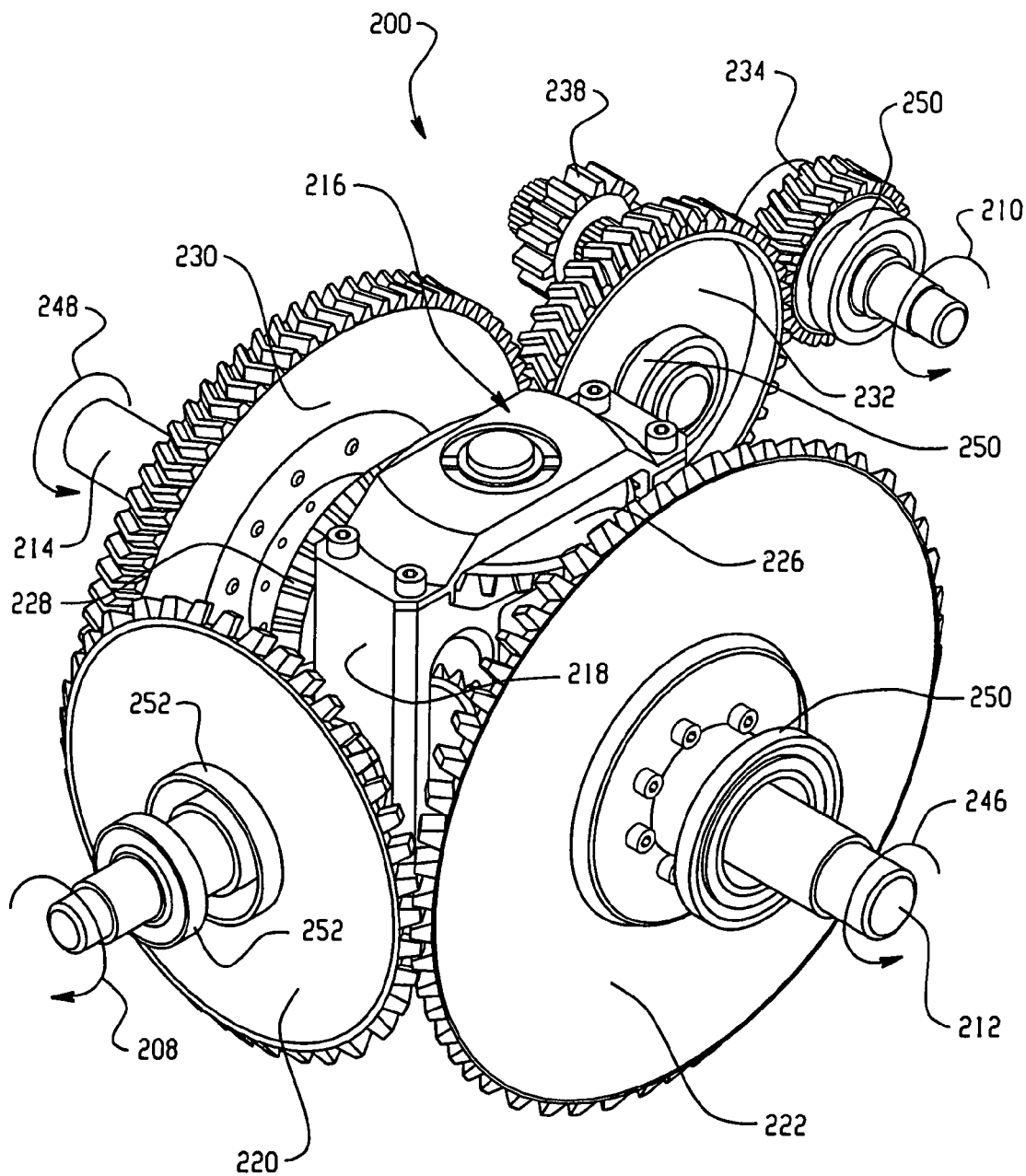
FIG. 4 is a front perspective view of one exemplary embodiment of a gear assembly for use in the transaxle in FIG. 3.
Figure 5:
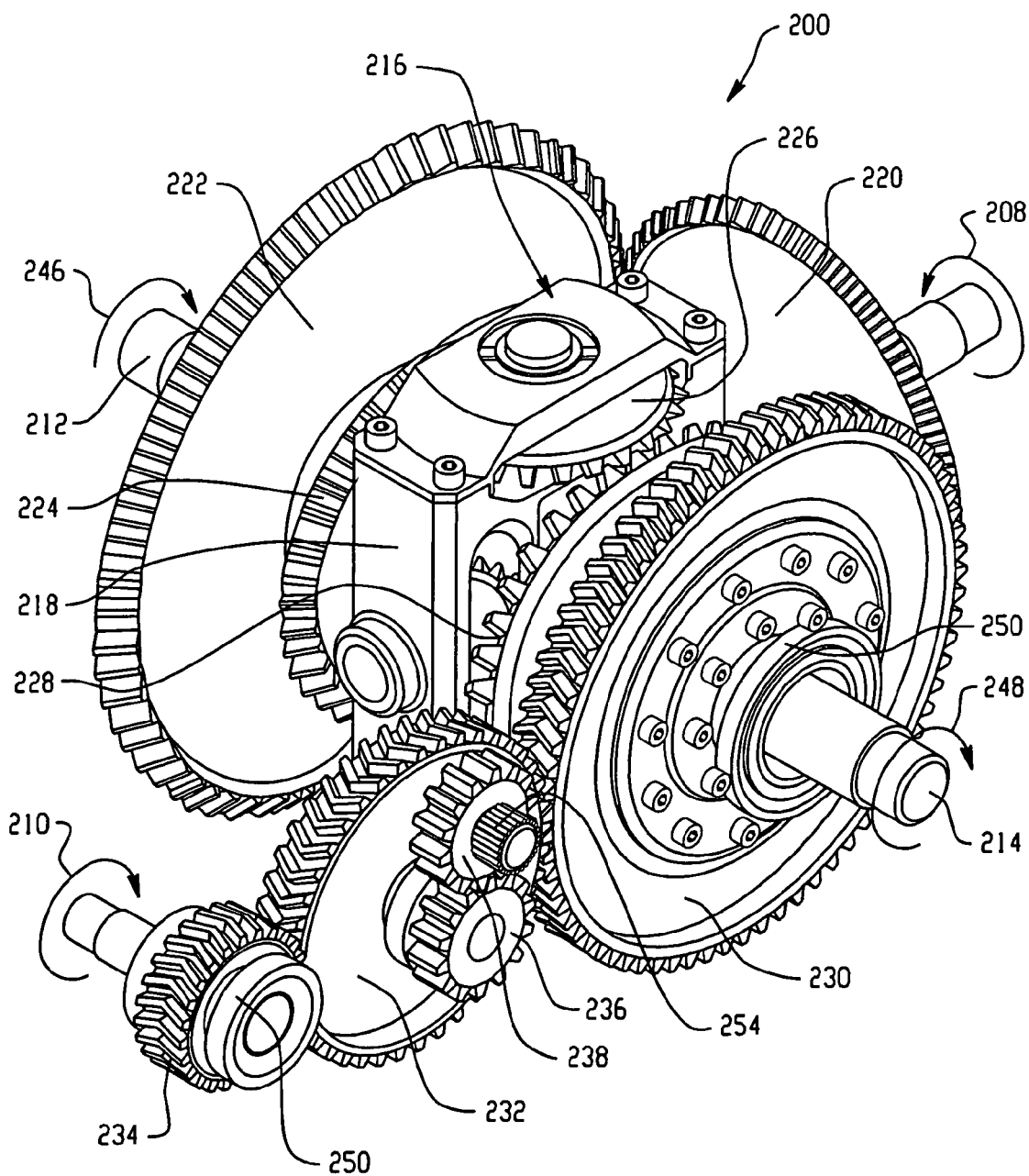
FIG. 5 is a rear perspective view of the gear assembly in FIG. 4.
Figure 6:
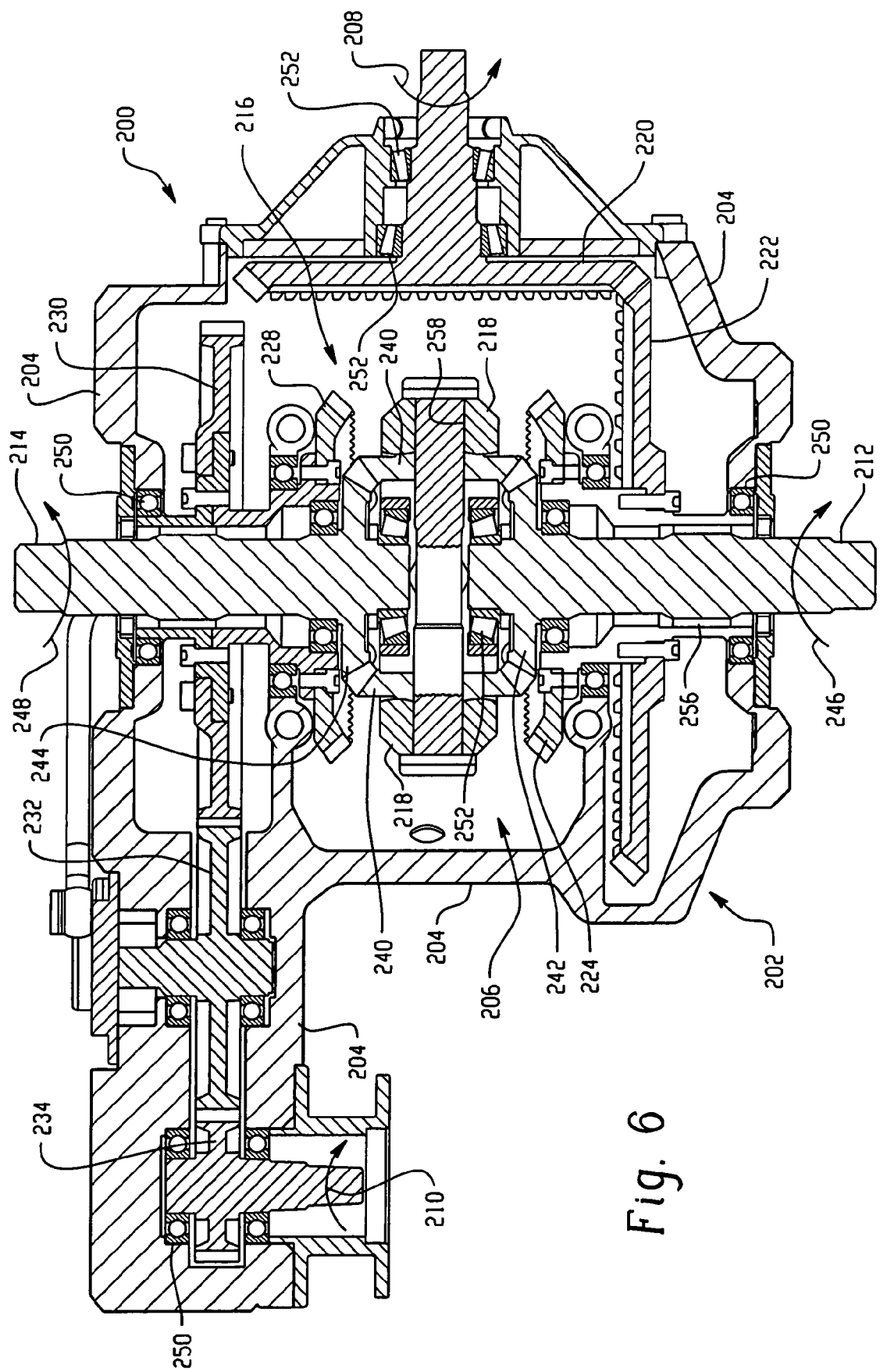
FIG. 6 is cross-sectional side view of the transaxle in FIGS. 3-5 taken along line 6-6 in FIG. 3.
Figure 7:
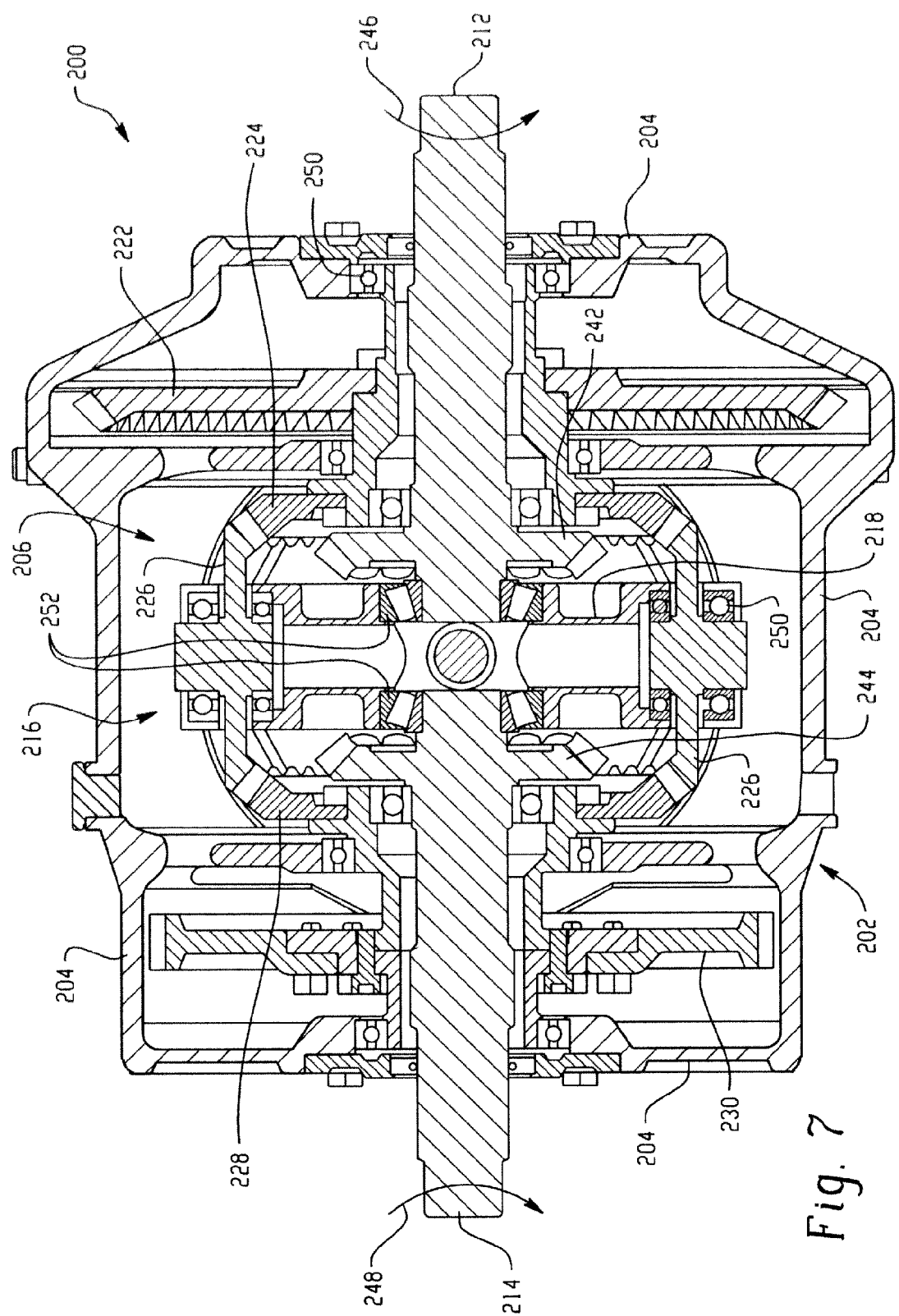
FIG. 7 is another cross-sectional side view of the transaxle in FIGS. 3-5 taken along line 7-7 in FIG. 3.

Turning now to the drawings wherein the showings are for the purpose of illustrating exemplary embodiments of the present novel concept only and not for limiting the same, FIG. 1 illustrates a vehicle 100 that includes a vehicle structural assembly 102, such as a vehicle body, frame or chassis, for example. The vehicle structural assembly is supported on a plurality of axles, such as a first or front axle 104A and a second or rear axle 104B. One or more wheels are supported on outboard ends of the axles, and support the axles and vehicle structural assembly on or along a ground surface (not shown). In the exemplary embodiment shown, wheels 106A and 106B are supported on the outer ends of first axle 104A, and wheels 106C and 106D are supported on the outer ends of second axle 104B. Axles 104A and 104B and wheels 106A-D can be of any suitable type, kind and/or configuration. In one exemplary embodiment, as will be discussed in additional detail hereinafter, axles 104A and 104B each include two independent axle sections. Wheels 106A-D are shown in FIG. 1 as being of substantially the same size. However, it will be appreciated that wheels of differing diameters and/or widths can optionally be used.

An engine 108 is supported on or along structural assembly 102, and can be of any suitable type, kind and/or configuration. For example, engine 108 could be an internal combustion engine having one or more reciprocating pistons or, alternately, could be a rotary internal combustion engine. Additionally, engine 108 can be operable on any type or kind of fuel, such as gasoline, diesel, hydrogen, ethanol, biodiesel, for example, or any other suitable fuels or combination of fuels. Furthermore, an engine operating on a different thermodynamic cycle could alternately be used, such as a sterling cycle engine, for example. In one preferred embodiment, engine 108 is a multi-cylinder internal combustion engine having an output power within a range of from about 100 hp to about 1000 hp. Additionally, normally aspirated engines or, alternately, engines utilizing forced air induction (e.g., turbo-charging, super-charging) can be used.

Vehicle 100 also includes a first electric machine 110 that is supported on or along structural assembly 102 in a suitable manner. First electric machine 110 can be of any suitable type, kind or construction, and can include any suitable performance characteristics or specifications. Suitable specifications for one exemplary embodiment of first electric machine 110 is shown in the below table.

| Output Power: 500 kW | | | | | |
|---|---|---|---|---|---|
| Dbl Layer Wind. Conn. | Wye | Number of Rotor Slots | 34 | Number of Stator Slots | 48 |
| Number of Poles | 8 | (Design) Frequency (Hz) | 220 | Rated Speed (RPM) | 3200 |
| Rated Voltage (V) | 680 | Efficiency | 93.8% | Breakdown Torque Ratio | 1.35 |
| Iron Core Length (mm) | 215 | Rated Slip | 0.029 | Breakdown Slip | 0.065 |
| Stator Outer Diam. (mm) | 323 | Shaft Torque (Nm) | 1485 | Breakdown Torque (Nm) | 2005 |
| Stator Inner Diam. (mm) | 200 | Stator Phase Current (A) | 655 | Brkdwn Phase Current (A) | 1070 |

As illustrated in FIG. 1, engine 108 includes first and second rotational connections 112 and 114. Additionally, first electric machine 110 includes first and second rotational connections 116 and 118. In the exemplary embodiment shown, engine 108 and first electric machine 110 are oriented along vehicle structural assembly 102 such that first rotational connections 112 and 116, respectively of engine 108 and first electric machine 110, are disposed toward one another. The first rotational connections are operatively connected to one another in a suitable manner and generally form a primary vehicle driveline. In one exemplary embodiment, a conventional torque tube or other suitable torque transmitting component directly connects first rotational connections 112 and 116. If directly connected, engine 108 and first electric machine 110 will rotate at the same angular velocity during operation. As such, in one preferred embodiment, the first electric machine is configured to have a maximum rotational speed that is approximately equivalent to the maximum rotational speed of the engine. Alternatively, an optional transmission 120 can be operatively connected between the engine and the first electric machine, and thereby permit the engine and first electric machine to have different maximum rotational speeds. In one exemplary embodiment, transmission 120 is a fixed ratio transmission operable to maintain a ratio of angular velocities between the engine and the first electric machine.

Vehicle 100 also includes an electrical power control system 122 in communication with first electric machine 110. Additionally, vehicle 100 includes one or more rechargeable electric storage devices 124, such as suitable batteries, for example, in communication with electrical power control system 122, which is operative to selectively transfer electrical power to, from and/or between devices 124 and first electric machine 110. It will be appreciated that the arrangement of engine 108, first electric machine 110 and storage devices 124, which is shown in FIG. 1, results in an approximately 50/50 weight distribution. However, any other suitable arrangement could alternately be used.

A first differential assembly or transaxle 126 is disposed along axle 106A and is operatively connected thereto. A second differential assembly or transaxle 128 is disposed along axle 106B and is operatively connected thereto. Additionally, second and third electric machines 130 and 132 are operatively connected to axles 106A and 106B, respectively, through first and second transaxles 126 and 128. The second and third electric machines respectively include rotational connections 134 and 136. Furthermore, second and third electric machines 130 and 132 are in electrical communication with electrical power control system 122 for selectively communicating with first electric machine 110 and/or storage devices 124. While transaxles 126 and 128 are shown and described herein as being substantially identical, it will be appreciated that the gear ratios thereof may differ somewhat, and/or the differential mechanism thereof may differ slightly. Such variations or others may be useful, such as for compensating for different diameters of front and rear tires, for example.

FIGS. 2-7 illustrate one exemplary embodiment of a transaxle 200, such as first and/or second differential assembly 126 and/or 128, for example. Transaxle 200 includes a housing 202 having housing walls 204 that at least partially define a housing cavity 206. Transaxle 200 includes a first rotational connection 208 and a second rotational connection 210. Though any suitable arrangement or configuration can alternately be use, in the exemplary embodiment shown, first rotational connection 208 is operatively connected to a rotational connection of the primary driveline, such as second rotational connection 114 of engine 108 or second rotational connection 118 of first electric machine 110, for example. Additionally, second rotational connection 210 is operatively connected to another rotational connection, such as rotational connection 134 of second electric machine 130 or rotational connection 136 of third electric machine 132, for example.

Transaxle 200 is also shown as being operatively connected to an axle, such as one of axles 104A and 104B, for example, to thereby drive or regeneratively brake the wheels operatively associated therewith. In the exemplary embodiment in FIG. 2, transaxle 200 is operatively associated with two axle sections 212 and 214 extending from opposing sides of housing 202. A differential carrier assembly 216 is rotatably supported within housing cavity 206 of housing 202, and includes a carrier structure 218 and a plurality of gears and/or pinions supported thereon, as will be discussed in additional detail hereinafter.

A first gear 220 is operatively connected to rotational connection 208, such as by being secured thereon or by being integrally formed therewith, for example. A second gear 222 is operatively connected to first gear 220, such as by meshingly engaging the same, for example. In the exemplary embodiment shown, second gear 222 is disposed along axle section 212 but is not directly operatively connected therewith. Rather, second gear 222 is operatively connected to a third gear 224 that is spaced inwardly thereof and rotationally fixed relative to the second gear. Thus, gears 222 and 224 rotate at the same angular velocity. Opposing pinions 226 are supported in spaced relation on carrier structure 218 and are operatively connected to third gear 224. A fourth gear 228 is disposed along axle section 214 generally opposite third gear 224 and is operatively connected to pinions 226. A fifth gear 230 is operatively connected to fourth gear 228, such as by a rotationally fixed connection, for example. As such, the fourth and fifth gears rotate at the same angular velocity. Additionally, fifth gear 230 is operatively connected to rotational connection 210, such as by using sixth and seventh gears 232 and 234, for example. Seventh gear 234 is operatively connected to rotational connection 210, such as by being secured thereon or by being integrally formed therewith, for example. Optionally, gears 236 and 238 (FIG. 5) or other suitable components can also be included, such as being operatively connected on or along the gear train formed by gears 230, 232 and 234, for example, and can be used to operate additional component, such as a pump (not shown), for example, or used to generate other outputs or output signals, for example.

Differential pinions 240 are supported on carrier structure 218 in spaced relation to one another and spaced inwardly of pinions 226. In one exemplary embodiment, pinions 240 and 226 are disposed on the carrier structure at right angles to one another along opposing portions (not numbered) of carrier structure 218. However, it will be appreciated that any suitable arrangement can be used. Axle pinions 242 and 244 are operatively connected to axle sections 212 and 214, respectively. One of skill in the relevant art will recognize that differential pinions 240, axle pinions 242 and 244, and carrier structure 218 together form an intra-axle differential suitable for operation in a typical manner.

As will be discussed in greater detail hereinafter, one advantage of a transaxle in accordance with the present novel concept, such as transaxle 200, for example, is that the same permits any amount, such as from about zero (0) percent to about one-hundred (100) percent, of the mechanical power input into the transaxle to be transferred to axles sections 212 and 214 respectively output thereby, as indicated by arrows 246 and 248. Additionally, mechanical power input into the transaxle from along the axle sections, such as during regenerative braking, for example, can also transferred to one or more of the rotational connections, such as rotational connections 208 and/or 210, for example.

It will be recognized by one of skill in that art that any suitable friction-reducing support arrangements can be used. For example, radial or angular contact ball bearings 250 can be used. Additionally, or in the alternative, tapered roller bearings 252 can be used. In other areas of transaxle 200, needle bearings 254 can be used. In some areas, plain bearings 256 may be suitable, such as where relatively low rotational speeds are typically experienced.

Figure 8:
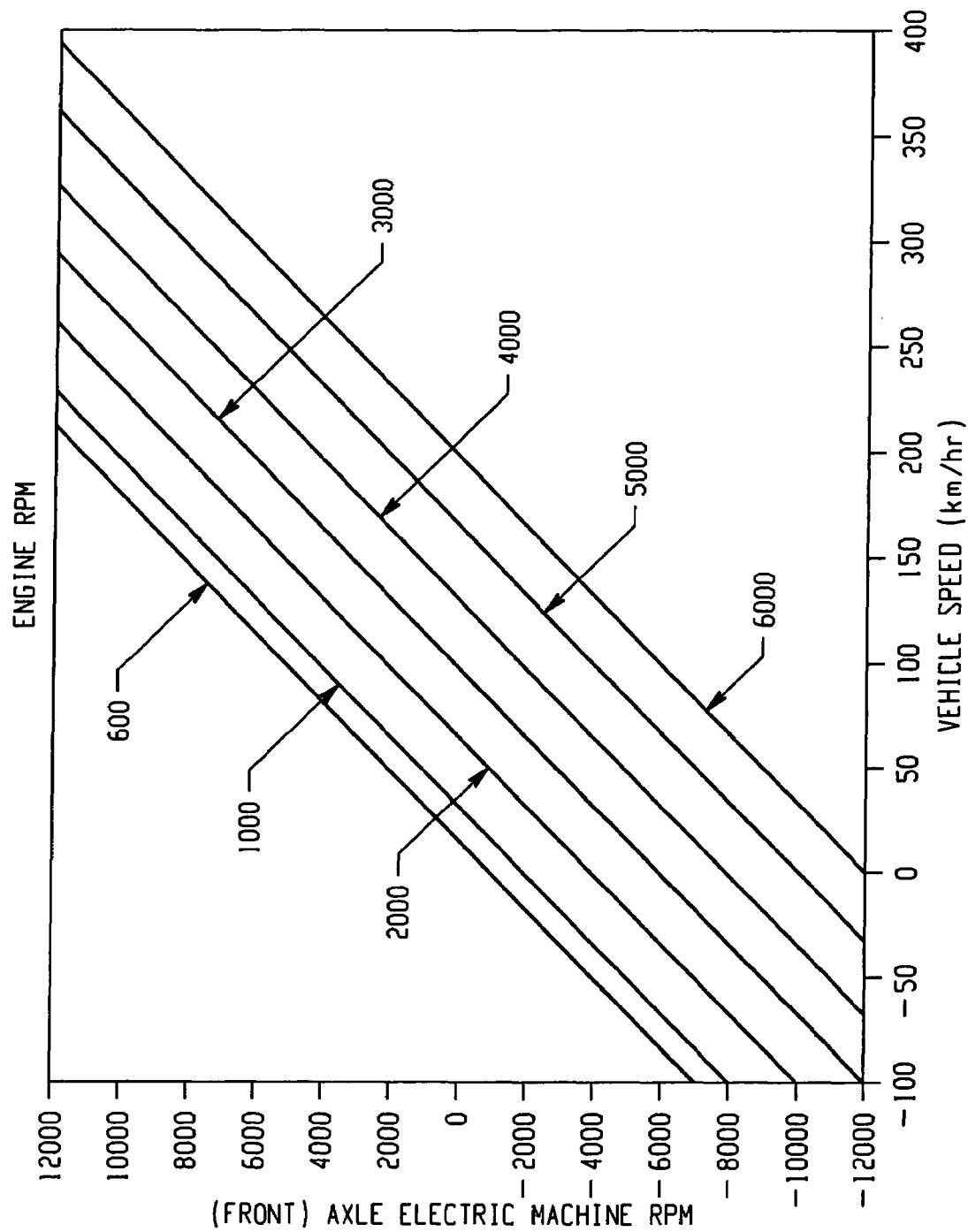
FIG. 8 is a diagrammatic representation illustrating engine speed as a function of axle electric machine speed and vehicle speed.

FIG. 8 is a diagrammatic representation of engine speed, such as that of engine 108, for example, as a function of vehicle speed and rotational speed of an axle electric machine, such as second electric machine 130 or third electric machine 132, for example. It will be appreciated that FIG. 8 represents operation of the vehicle in traction, as opposed to during braking in which regeneration may be used. As an example of the representation in FIG. 8, an arbitrary vehicle speed of 100 km/hr is selected. At an engine speed of 1000 rpm, an associated axle electric machine would be operating at +4000 rpm. That is, at 1000 rpm the engine does not deliver enough power to the axle to maintain the vehicle speed of 100 km/hr. As such, the associated axle electric machine operates as a motor running at about 4000 rpm and supplying additional power to the axle to maintain the desired vehicle speed.

Alternately, an engine speed of 5000 rpm could be used. However, at this engine speed considerably more power would be generated than is needed to maintain the 100 km/hr speed of the vehicle. As such, the associated axle electric machine would be operating at about −4000 rpm. That is, the associated axle electric machine would be operating as a generator running at 4000 rpm in an opposing direction and thereby converting the extra power from the engine into electrical power that can be stored or otherwise used. As a further example, at an engine speed of approximately 3000 rpm could be used. At this engine speed, just about the right amount of power is produced and the associated axle electric machine would have an approximately zero (0) rotational speed.

Figure 9:
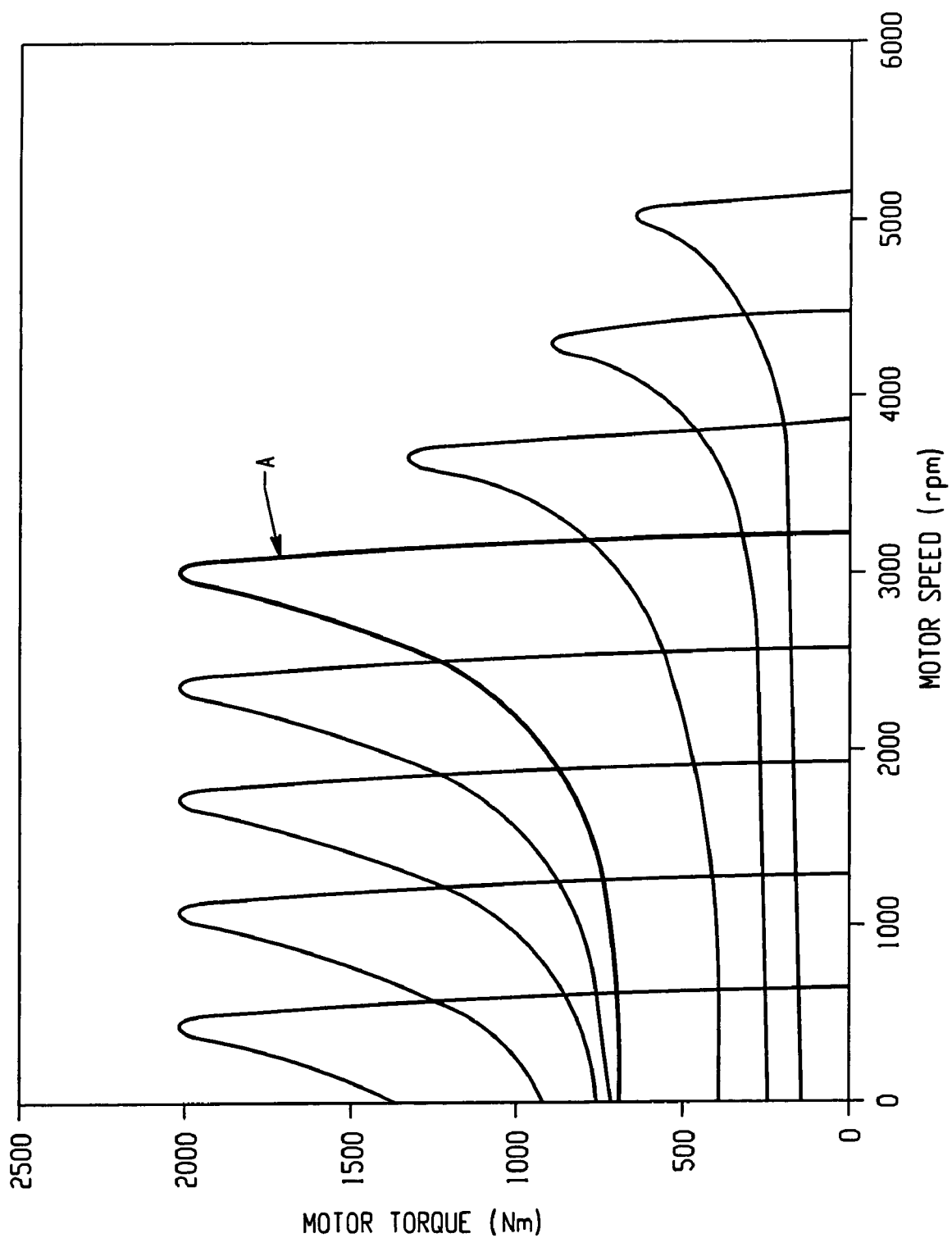
FIG. 9 is a diagrammatic representation illustrating torque-speed curves for of a driveline electric machine.

FIG. 9 is a diagrammatic representation of various torque versus speed curves for one exemplary embodiment of a first electric machine, such as first electric machine 110, for example. Curve A in FIG. 9 represents a first electric machine operating at a base voltage of 680V and a design frequency of 220 Hz. The curves to the left of curve A result from lower frequencies and lower voltages with the flux being held constant. The curves to the right of curve A result from higher frequencies but constant voltage. Thus, the peak torque is seen to decrease in this field weakened region. Collectively, the curves provide the peak performance envelope of a suitable first electric machine.

Figure 10:
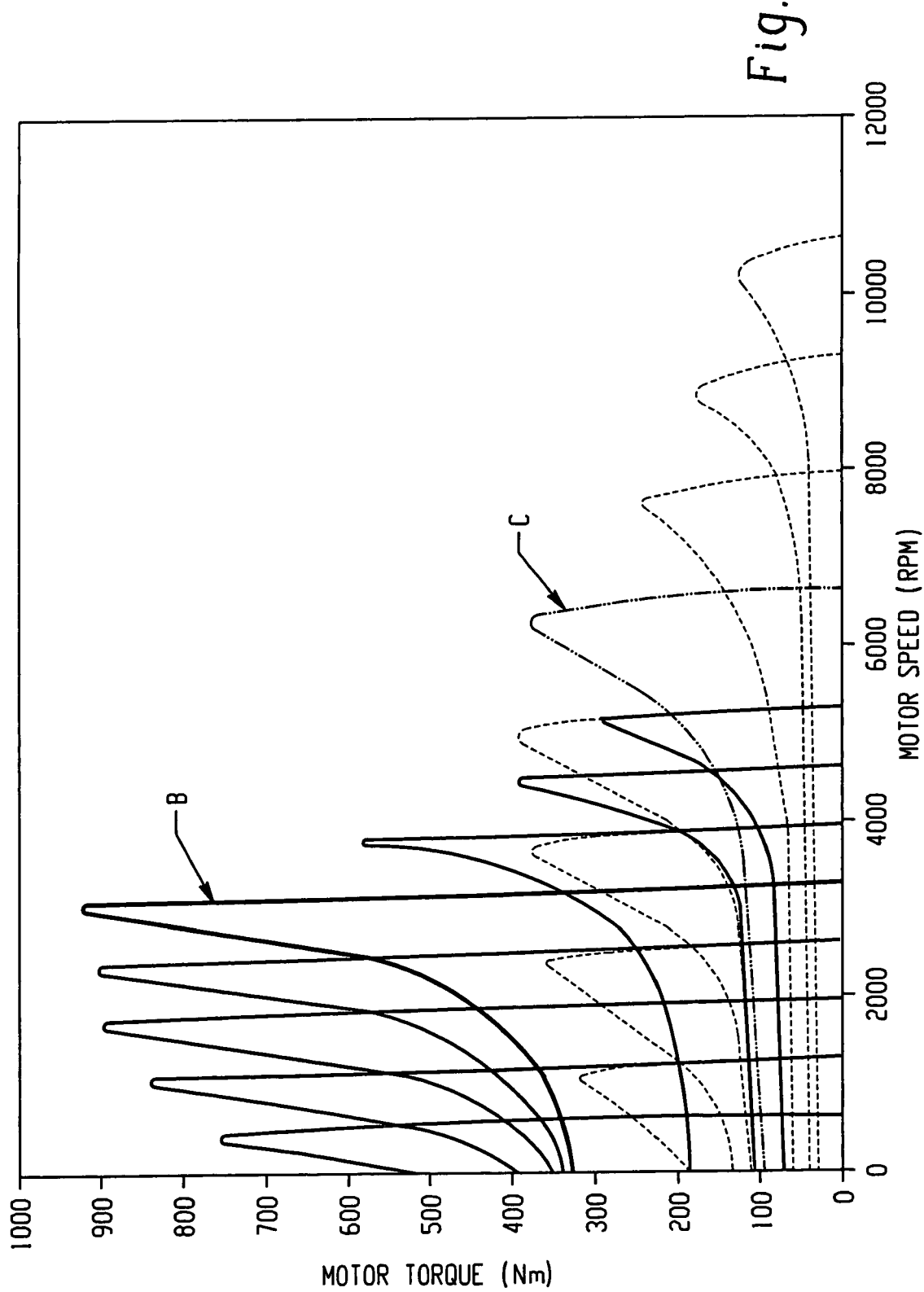
FIG. 10 is a diagrammatic representation illustrating torque-speed curves for an axle electric machine.

FIG. 10 is a diagrammatic representation of various torque versus speed curves for an axle electric machine, such as second electric machine 130 or third electric machine 132, for example. It will be recognized from FIG. 10 that two families of torque versus speed curves are displayed. One family of curves corresponds to an axle electric machine operating under a first condition, such as an 8 pole configuration, for example. In one exemplary embodiment of an axle electric machine, an 8 pole configuration can provide relatively high torque, such as about 900 to about 1000 Nm, for example, but at relatively low speeds. Thus, under conditions of use in which the axle electric machine rotates at less than 5000 rpm, for example, an 8 pole configuration can be used. Curve B in FIG. 10 represents an axle electric machine with an 8 pole configuration operating at a base voltage of 680V and a design frequency of 220 Hz.

The second family of curves corresponds to the axle electric machine operating under a second, different condition, such as a 4 pole configuration, for example. Compared to the 8 pole configuration discussed above, the 4 pole configuration provides relatively low torque, such as from about 350 to about 400 Nm, for example, but can operate at much higher speeds. Thus, under conditions of use in which the axle electric machine rotates at greater than 5000 rpm, for example, a 4 pole configuration can be use, which may allow operation of up to 12000 rpm, for example. Curve C in FIG. 10 represents an axle electric machine with an 4 pole configuration operating at a base voltage of 680V and a design frequency of 220 Hz.

As discussed above, the curves to the left of curves B and C result from lower frequencies and lower voltages with the flux being held constant. The curves to the right of curves B and C result from higher frequencies but constant voltage. Thus, the peak torque is seen to decrease in this field weakened region. Collectively, the curves provide the peak performance envelope of a suitable first electric machine.

To permit the axle electric machines to match the desired operation speed range, an arrangement is used, such as within electrical power control system 122, for example, to switch the axle electric machines between the 4 pole and the 8 pole configurations. This can be done in any suitable manner, such as by using electronic switches, for example.

An electrically-variable transmission or powertrain, such as the arrangement shown in and described with regard to FIG. 1, for example, is capable of operating under a wide range of performance conditions. For purposes of discussion and ease of understanding, and without constituting a limitation, such performance conditions can be broadly categorized as high speed operation, low speed operation and economy operation. It will be appreciated that the foregoing categories of operation assume operation at relatively constant speeds, and that while a vehicle having an electrically-variable transmission in accordance with the present novel concept is capable of operation under other performance conditions, such as very rapid acceleration and hard braking, such performance conditions are not specifically referred to herein.

Figure 11:
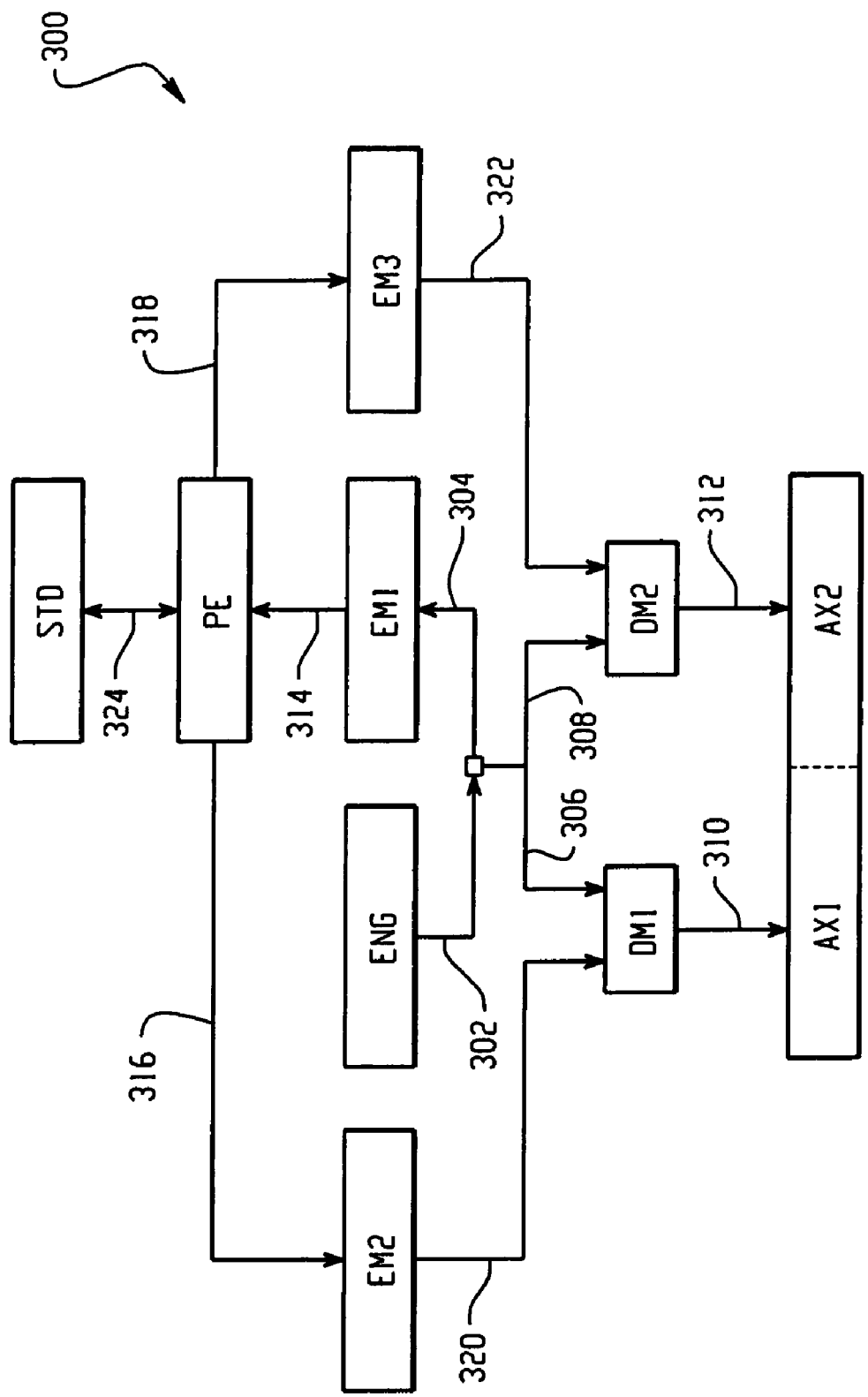
FIG. 11 illustrates one exemplary method of powering a vehicle in accordance with the present novel concept.

Generally, high speed operation will include very high vehicle speeds, such as from about 100 mph (160 kph) to about 225 mph (360 kph), for example. Under such operating conditions, the torque required to maintain the vehicle speed will often be rather low in comparison to other operating conditions, such as the torque required to operate a vehicle on a high grade or to provide a high acceleration, for example. However, at such vehicle speeds, the power loads will be very high due to the high rotational speed of the engine. One exemplary method of power transmission through an electrically-variable transmission in accordance with the present novel concept is shown in FIG. 11 as method 300. As mentioned above, high rotational speeds, but relatively low torque, are generally demanded under such conditions of use. As such, the tremendous torque generating capacity of first electric machine EM1, such as first electric machine 110, for example, may not be utilized, because sufficient torque can normally be provided by engine ENG, such as engine 108, for example.

Method 300 includes generating rotational output using engine ENG, as indicated by arrow 302. Method 300 also includes transmitting a first portion of the rotational output to first electric machine EM1, as indicated by arrow 304. The method also includes transmitting a second portion of the rotational output to differential mechanisms DM1 and DM2, such as through transaxles 126 and 128, for example, as is respectively indicated by arrows 306 and 308. Method 300 also includes transmitting rotational output from the differential mechanisms to axles AX1 and AX2, such as axles 104A and 104B, for example, as indicated by arrows 310 and 312, respectively.

Method 300 further includes generating electrical power using the rotational output transmitted from along arrow 304 to first electric machine EM1 and transmitting the electrical power to suitable power electronics PE, such as electrical power control system 122, for example, as is indicated by arrow 314. Method 300 further includes selectively transmitting electrical power from power electronics PE to second and/or third electric machines EM2 and/or EM3, such as second electric machine 130 and/or third electric machine 132, for example, as indicated by arrows 316 and 318. Method 300 still further includes transmitting rotational output from machines EM2 and EM3 to differential mechanisms DM1 and DM2, as indicated by arrows 320 and 322. This additional rotational output is transmitted to axles AX1 and AX2 along with the rotational output from along arrows 306 and 308, as indicated by arrows 310 and 312. Further still, method 300 includes selectively transferring electrical energy to and/or from storage device STD, as indicated by arrow 324.

Figure 12:
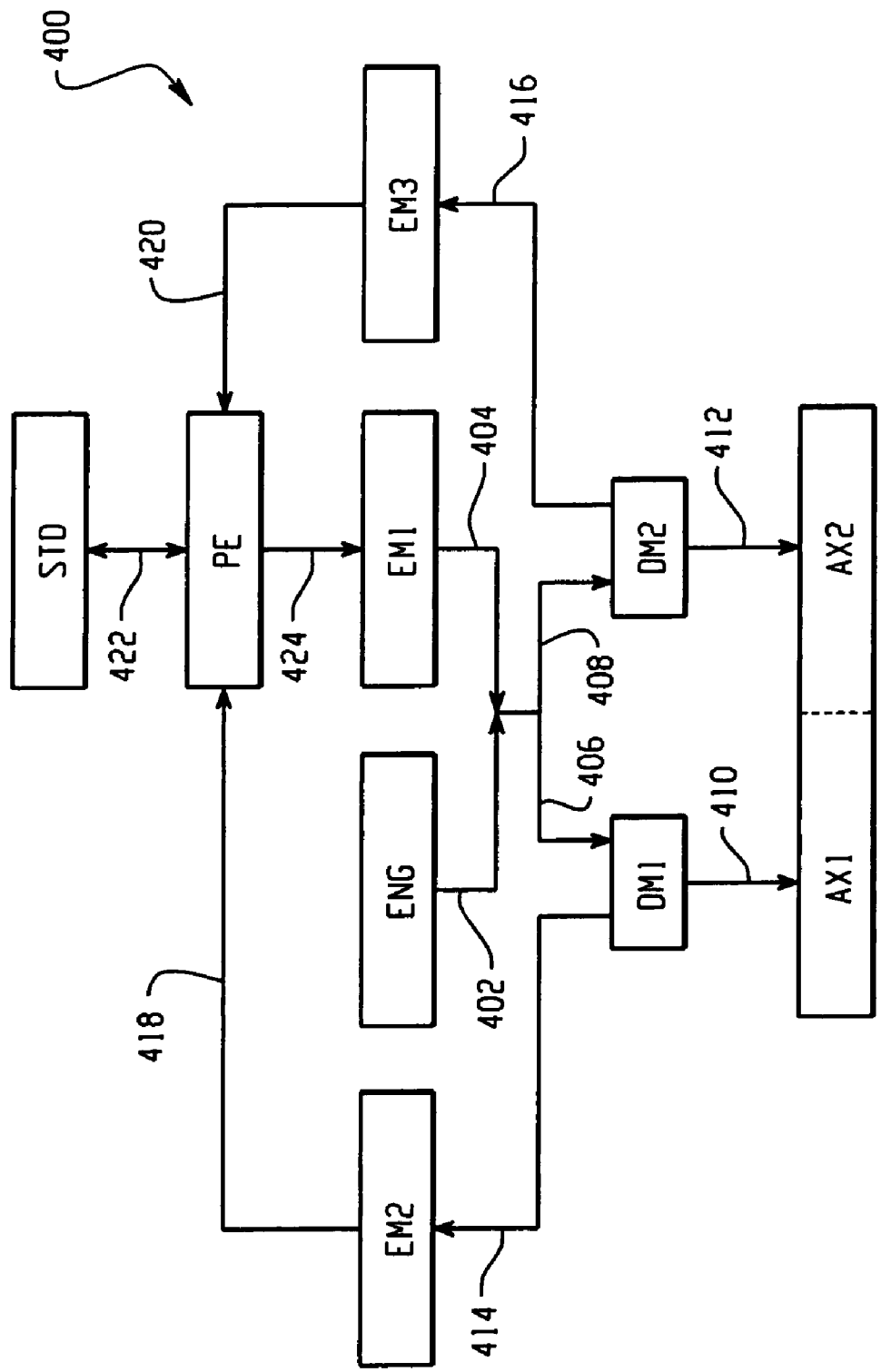
FIG. 12 illustrates another exemplary method of powering a vehicle in accordance with the present novel concept.

Generally, low speed operation will include relatively low vehicle speeds, such as speeds of less than about 40 mph, for example. Additionally, due to the nature of certain low speed driving conditions, such as along high grades or at high accelerations, for example, this performance condition will generally include relatively high torque loads. However, this typically translates into only moderate power loads, due to the relatively low rotational speed of the engine. Another exemplary method of power transmission through an electrically-variable transmission in accordance with the present novel concept is shown in FIG. 12 as method 400. As mentioned above, relatively low rotational speeds but substantial torque loads are generally demanded under such conditions of use. As such, the torque generating capacity of first electric machine EM1 is of significant value during these performance conditions.

Method 400 includes generating rotational output using engine ENG, as indicated by arrow 402. Additionally, method 400 includes generating rotational output using first electric machine EM1, as indicated by arrow 404. Method 400 also includes transmitting the rotational output from engine ENG and machine EM1 to differential mechanisms DM1 and DM2, as indicated by arrows 406 and 408. Furthermore, method 400 includes delivering a first portion of the rotational output from the differential mechanisms to axles AX1 and AX2, as indicated by arrows 410 and 412, respectively. Method 400 also includes delivering or otherwise transmitting a second portion of the rotational output from differential mechanism DM1 to second electric machine EM2, as indicated by arrow 414. Method 400 further includes delivering or otherwise transmitting a second portion of the rotational output from differential mechanism DM2 to third electric machine EM3, as indicated by arrow 416.

Further still, method 400 includes generating electrical energy using machines EM2 and EM3 from the rotational output delivered thereto from along arrows 414 and 416, respectively, and transmitting the electrical energy to power electronics PE, as indicated by arrows 418 and 420. Method 400 also includes selectively transmitting electrical energy, such as that from along arrows 418 and/or 420, to and/or from electrical storage device STD, as indicated by arrow 422. Method 400 further includes selectively transferring electrical energy, such as from along any one or more of arrows 418-422, to machine EM1, as indicated by arrow 424.

Figure 13:
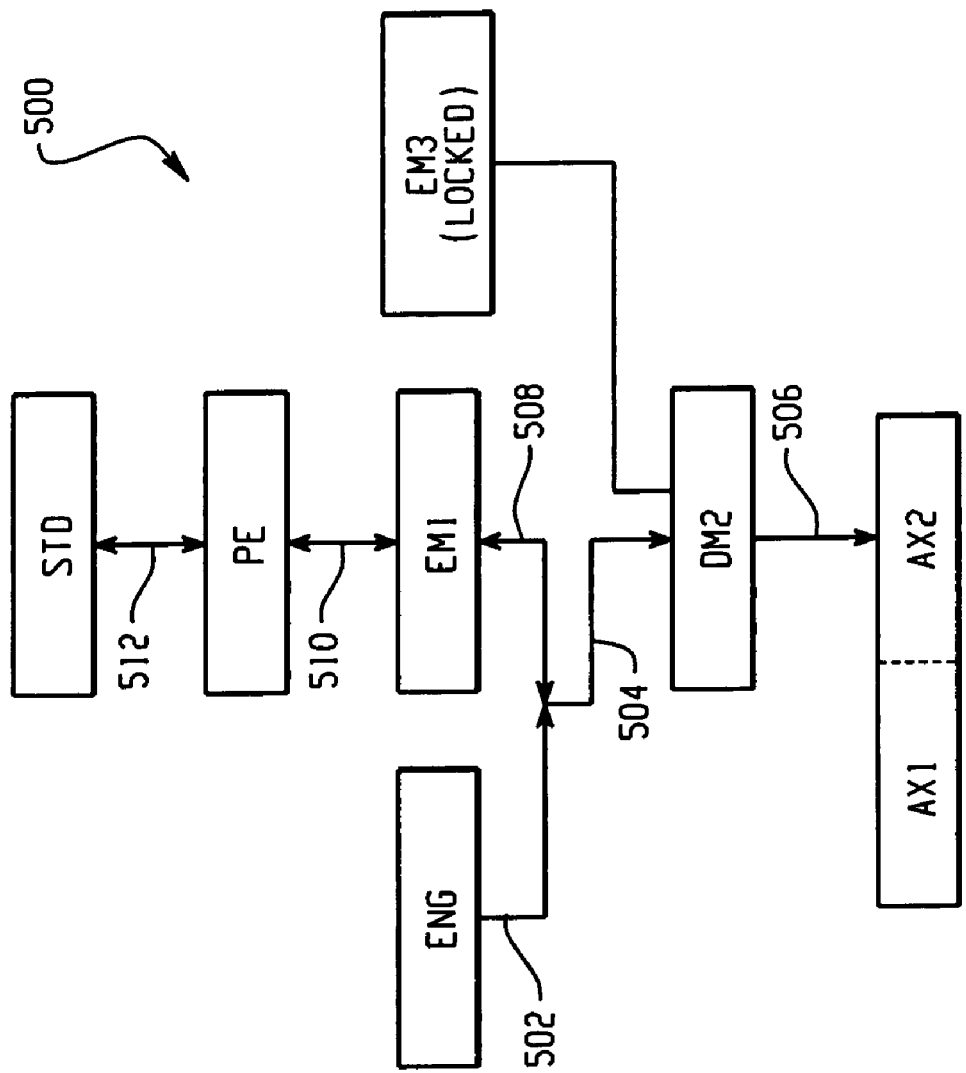
FIG. 13 illustrates a further exemplary method of powering a vehicle in accordance with the present novel concept.

Generally, economy operation will occur at vehicle speeds suitable for use on speed restricted public roadways, such as from about 45 mph (70 kph) to about 85 mph (135 kph), for example. Typically, such operation will utilize very little torque and only moderate rotational speeds of the engine. As such, relatively low power is normally required. A further exemplary method of power transmission through an electrically-variable transmission in accordance with the present novel concept is shown in FIG. 13 as method 500. As mentioned above, minimal torque loads and relatively low rotational speed are generally demanded under such conditions of use. As such, the most efficient operational speed of engine ENG is targeted and attempts are made to maintain engine operation within this high efficiency operational range by augmenting engine output with torque output by first electric machine EM1 that is used output to overcome temporary demands for increased torque. Under conditions in which extra power is available from engine ENG, this extra power can be used to recharge the electrical energy storage device STD.

Method 500 includes generating rotational output using engine ENG, as indicated by arrow 502. Method 500 also includes transmitting the rotational output from engine ENG differential mechanism DM2, as indicated by arrows 504. Furthermore, method 500 includes delivering the rotational output from the differential mechanism to axle AX2, as indicated by arrows 506. Third electric machine EM3 is indicated as undergoing a locked rotor condition, which results in a high efficiency transmission that directs all of the rotational output from along arrow 506 into axle AX2. Second electric machine EM2 is not shown in FIG. 13 as no rotational output is delivered to axle AX1.

Depending upon the conditions of performance, method 500 can optionally include generating additional rotational output using machine EM1, as indicated by arrow 508, and delivering the additional rotational output to differential mechanism DM2, such as along arrow 504. Alternately, depending upon the conditions of performance, method 500 can optionally include transmitting a portion of the rotational output from engine ENG along arrow 504 to machine EM1. The method can then further include generating electrical power at machine EM1 using the rotational input from the engine and transmitting the electrical power to power electronics PE, as indicated by arrow 510. Method 500 can further include selectively transferring electrical power to, from and/or between electrical storage device STD and machine EM1, as indicated by arrow 512.

While the subject novel concept has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles of the subject novel concept. Obviously, modifications and alterations will occur to others upon reading and understanding the preceding detailed description. Accordingly, it is to be distinctly understood that the foregoing descriptive matter is to be interpreted merely as illustrative of the present novel concept and not as a limitation. As such, it is intended that the subject novel concept be construed as including all such modifications and alterations insofar as they come within the scope of this disclosure and/or the claims appended hereto.

The invention claimed is:

1. A vehicle transaxle operatively connecting opposing associated axle portions, a first associated rotational motion source and a second associated rotational motion source, said vehicle transaxle comprising:
  a transaxle housing including a housing wall at least partially defining a housing cavity;
  a gear carrier assembly disposed within said housing cavity and including a carrier structure, first and second pinions supported in spaced relation on said carrier structure and operatively connected to the opposing axle portions, and third and fourth pinions supported in spaced relation on said carrier structure;
  a first gear disposed within said housing cavity and operatively connected to the first associated rotational motion source;
  a second gear disposed within said housing cavity and operatively connected to said first gear;
  a third gear disposed within said housing cavity and operatively connected to at least one of said third and fourth pinions, and said third gear operatively connected in rotationally-fixed relation to said second gear such that said second and third gears rotate at a common angular velocity;
  a fourth gear disposed within said housing cavity and operatively connected to at least one of said third and fourth pinions; and,
  a fifth gear disposed within said housing cavity and operatively connected to the second associated rotational motion source, and said fifth gear operatively connected in rotationally-fixed relation to said fourth gear such that said fourth and fifth gears rotate at a common angular velocity.

2. A vehicle transaxle according to claim 1 further comprising a first axle pinion secured on the one of the opposing associated axle portions and a second axle pinion secured on the other of the opposing associated axle portions, said first and second axle pinions operatively connected to said first and second pinions.

3. A vehicle transaxle according to claim 2, wherein said first and second axle pinions directly interengage said first and second pinions of said gear carrier assembly.

4. A vehicle transaxle according to claim 2, wherein said third and fourth gears are disposed in approximate rotational alignment with said first and second axle pinions such that said third and fourth gears and said first and second axle pinions rotate about a common axis.

5. A vehicle transaxle according to claim 4, wherein said third and fourth gears are disposed in outwardly-spaced relation to said first and second axle pinions.

6. A vehicle transaxle according to claim 1 further comprising a sixth gear operatively connected to and directly interengaging said fifth gear, and a seventh gear disposed within said housing cavity operatively connected to and directly interengaginq said sixth gear, and said seventh gear operatively connected to the second associated rotation motion source.

7. A vehicle transaxle according to claim 1, wherein at least one of said first gear, said second gear, said third gear, said fourth gear or said fifth gear includes one of a bevel gear, a spur or a herringbone tooth form.

8. A vehicle transaxle according to claim 1, wherein said third and fourth pinions of said gear carrier assembly directly interengage said third and fourth gears.

9. A vehicle transaxle according to claim 1, wherein said first gear directly interengages said second gear.

10. A vehicle transaxle according to claim 1, wherein said third and fourth pinions of said gear carrier assembly are disposed in outwardly-spaced relation with respect to said first and second pinions of said gear carrier assembly.

11. An apparatus for operatively connecting associated opposing first axle portions of a vehicle, said apparatus comprising:
  a first housing including a first housing wall at least partially defining a first housing cavity;
  a first gear carrier assembly disposed within said first housing cavity and including a first carrier structure, first and second pinions supported in spaced relation to one another on said first carrier structure and operatively connected to the associated opposing first axle portions, and third and fourth pinions supported in spaced relation to one another on said first carrier structure;
  a first gear disposed within said first housing cavity and adapted for operative connection to a first rotational motion source;
  a second gear disposed within said first housing cavity and operatively connected to said first gear;
  a third gear disposed within said first housing cavity, said third gear operatively connected to at least one of said third and fourth pinions within said first housing cavity and operatively connected in rotationally-fixed relation to said second gear such that said second and third gears rotate at a common angular velocity;
a fourth gear disposed within said first housing cavity and operatively connected to at least one of said third and fourth pinions; and,
a fifth gear disposed within said first housing cavity, said fifth gear adapted for operative connection to a second rotational motion source and operatively connected in rotationally-fixed relation to said fourth gear such that said fourth and fifth gears rotate at a common angular velocity.

12. An apparatus according to claim 11, wherein said second gear directly interengages said first gear.

13. An apparatus according to claim 11, wherein said fourth gear directly interengages said fifth gear.

14. An apparatus according to claim 11 further comprising a first axle pinion operatively connected in rotationally-fixed relation to one of the opposing first axle portions and a second axle pinion operatively connected in rotationally-fixed relation to the other of the opposing first axle portions, said first and second axle pinions directly interengaging said first and second pinions of said first carrier structure.

15. An apparatus according to claim 11 further comprising:
an engine including first and second rotational connections, said first rotational connection being operatively connected to said first gear in said first housing cavity and operative as said first rotational motion source such that rotational output from said engine is communicated to said first gear in said first housing cavity;
a first electric machine including first and second rotational connections, said first rotational connection of said first electric machine being operatively connected to said second rotational connection of said engine;
a second electric machine including a rotational connection, said rotational connection being operatively connected to said fifth gear in said first housing cavity and operative as said second rotational motion source such that rotational output from one of said fifth gear and said second electric machine is communicated to the other of said fifth gear and said second electric machine;
a third electric machine including a rotational connection;
a second housing including a second housing wall at least partially defining a second housing cavity;
a second gear carrier assembly disposed within said second housing cavity and including a second carrier structure, first and second pinions supported in spaced relation on said second carrier structure and operatively connected to associated opposing second axle portions, and third and fourth pinions supported in spaced relation on said second carrier structure;
a first gear disposed within said second housing cavity, said first gear being operatively connected to said second rotational connection of said first electric machine such that rotational output from said first electric machine is communicated to said first gear in said second housing cavity;
a second gear disposed within said second housing cavity and operatively connected to said first gear within said second housing cavity;
a third gear disposed within said second housing cavity, said third gear operatively connected to at least one of said third and fourth pinions within said second housing cavity and operatively connected in rotationally-fixed relation to said second gear within said second housing cavity such that said second and third gears rotate at a common angular velocity;
a fourth gear disposed within said second housing cavity and operatively connected to at least one of said third and fourth pinions within said second housing cavity; and,
a fifth gear disposed within said second housing cavity, said fifth gear operatively connected to said rotational connection of said third electric machine such that rotational output from one of said fifth gear and said third electric machine is communicated to the other of said fifth gear and said third electric machine, and said fifth gear being operatively connected in rotationally-fixed relation to said fourth gear within said second housing cavity such that said fourth and fifth gears rotate at a common angular velocity.

16. An apparatus according to claim 15 further comprising an electrical power storage device operatively connected to at least said second electric machine such that said second electric machine can generate rotational output based on energy supplied by said electrical power storage device and such that said fifth gear within said first housing cavity is rotated based at least in part using said rotational output being communicated from said second electric machine to said fifth gear within said first housing cavity.

17. An apparatus according to claim 15 further comprising:
a vehicle structure assembly;
a first axle operatively supporting said vehicle structure assembly and having opposing first and second axle ends, said first axle including a first axle portion and an opposing second axle portion that operate as the associated opposing first axle portions with said first and second axle portions being operatively connected to said first and second pinions of said first gear carrier assembly within said first housing cavity, said first axle portion having said first axle end of said first axle and said second axle portion having said second axle end of said first axle; and,
a second axle operatively supporting said vehicle structure assembly and having opposing first and second axle ends, said second axle including a first axle portion and an opposing second axle portion that operate as the associated opposing second axle portions with said first and second axle portions being operatively connected to said first and second pinions of said second gear carrier assembly within said second housing cavity, said first axle portion having said first axle end of said second axle and said second axle portion having said second axle end of said second axle;
a first ground-engaging element operatively connected to said first end of said first axle portion of said first axle;
a second ground-engaging element operatively connected to said second end of said second axle portion of said first axle;
a third ground-engaging element operatively connected to said first end of said first axle portion of said second axle; and,
a fourth ground-engaging element operatively connected to said second end of said second axle portion of said second axle.

18. An apparatus according to claim 11 further comprising:
a first electric machine including first and second rotational connections, said first rotational connection being operatively connected to said first gear in said first housing cavity and operative as said first rotational motion source such that rotational output from said first electric machine is communicated to said first gear in said first housing cavity;

an engine including first and second rotational connections, said first rotational connection of said engine being operatively connected to said second rotational connection of said first electric machine;

a second electric machine including a rotational connection, said rotational connection being operatively connected to said fifth gear in said first housing cavity and operative as said second rotational motion source such that rotational output from one of said fifth gear and said second electric machine is communicated to the other of said fifth gear and said second electric machine;

a third electric machine including a rotational connection;

a second housing including a second housing wall at least partially defining a second housing cavity;

a second gear carrier assembly disposed within said second housing cavity and including a second carrier structure, first and second pinions supported in spaced relation on said second carrier structure and operatively connected to opposing second axle portions, and third and fourth pinions supported in spaced relation on said second carrier structure;

a first gear disposed within said second housing cavity, said first gear being operatively connected to said second rotational connection of said engine such that rotational output from said engine is communicated to said first gear in said second housing cavity;

a second gear disposed within said second housing cavity and operatively connected to said first gear within said second housing cavity;

a third gear disposed within said second housing cavity, said third gear operatively connected to at least one of said third and fourth pinions within said second housing cavity and operatively connected in rotationally-fixed relation to said second gear within said second housing cavity such that said second and third gears rotate at a common angular velocity;

a fourth gear disposed within said second housing cavity and operatively connected to at least one of said third and fourth pinions within said second housing cavity; and, a fifth gear disposed within said second housing cavity, said fifth gear operatively connected to said rotational connection of said third electric machine such that rotational output from one of said fifth gear and said third electric machine is communicated to the other of said fifth gear and said third electric machine, and said fifth gear being operatively connected in rotationally-fixed relation to said fourth gear within said second housing cavity such that said fourth and fifth gears rotate at a common angular velocity.

19. An apparatus according to claim 18 further comprising an electrical power storage device operatively connected to at least one of said first and second electric machines such that said at least one of said first and second electric machines can generate rotational output based on energy supplied by said electrical power storage device with said rotational output being respectively communicated to at least one of said first gear within said first housing cavity and said fifth gear within said first housing cavity.

20. An apparatus according to claim 18 further comprising:
a vehicle structure assembly;
a first axle operatively supporting said vehicle structure assembly and having opposing first and second axle ends, said first axle including a first axle portion and an opposing second axle portion that operate as the associated opposing first axle portions with said first and second axle portions being operatively connected to said first and second pinions of said first gear carrier assembly within said first housing cavity, said first axle portion having said first axle end of said first axle and said second axle portion having said second axle end of said first axle;
a second axle operatively supporting said vehicle structure assembly and having opposing first and second axle ends, said second axle including a first axle portion and an opposing second axle portion that operate as the associated opposing second axle portions with said first and second axle portions being operatively connected to said first and second pinions of said second gear carrier assembly within said second housing cavity, said first axle portion having said first axle end of said second axle and said second axle portion having said second axle end of said second axle;
a first ground-engaging element operatively connected to said first end of said first axle portion of said first axle;
a second ground-engaging element operatively connected to said second end of said second axle portion of said first axle;
a third ground-engaging element operatively connected to said first end of said first axle portion of said second axle;
a fourth ground-engaging element operatively connected to said second end of said second axle portion of said second axle.

\* \* \* \* \*